Dec. 9, 1924.

S. W. FARNHAM 1,518,137

ELECTRICAL SYSTEM FOR LOCOMOTIVES

Filed Dec. 22, 1922   2 Sheets-Sheet 1

Witness
Herbert Buehler.

Inventor
Sidney W. Farnham
By Clarence F. Poole
Atty

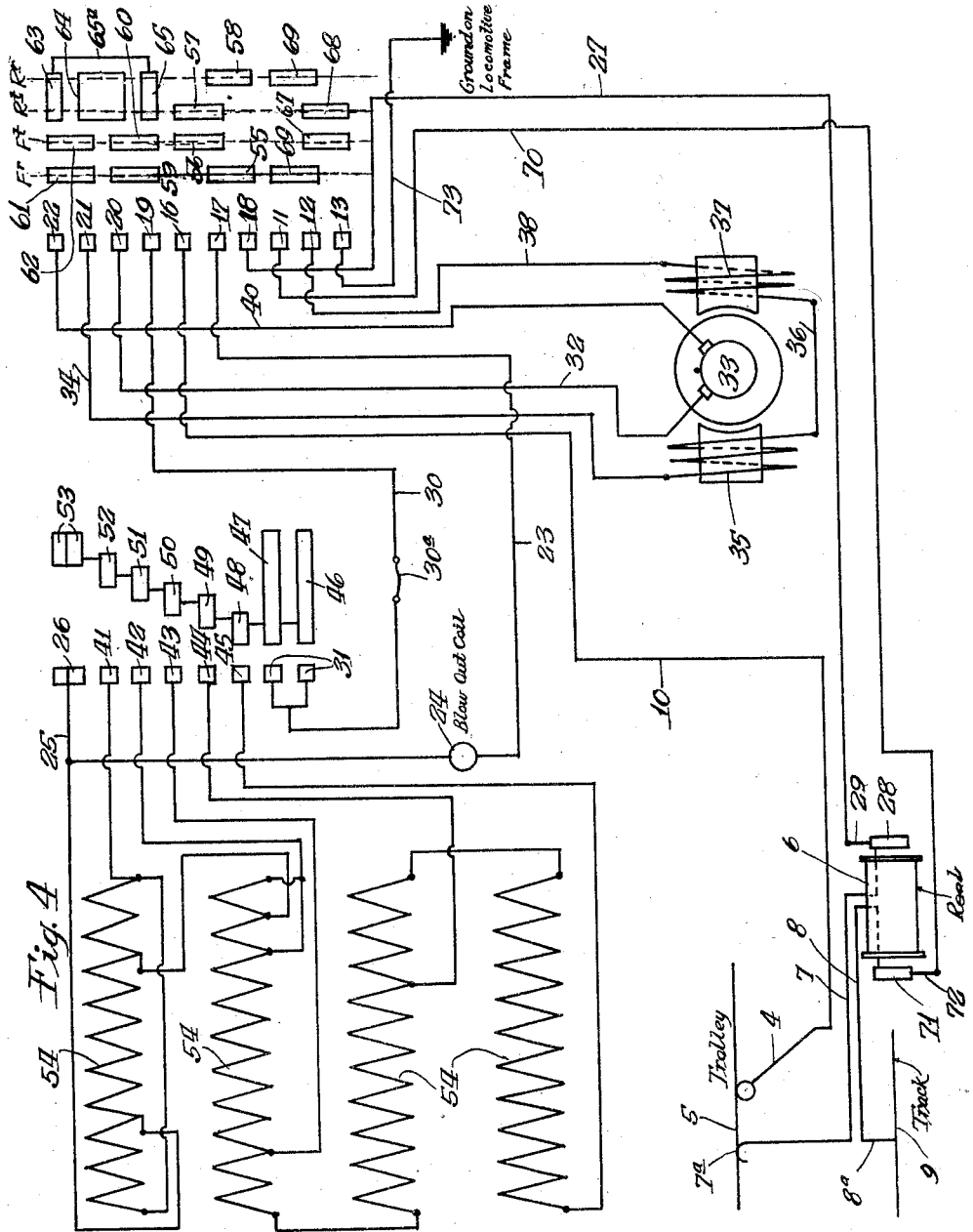

Patented Dec. 9, 1924.

1,518,137

UNITED STATES PATENT OFFICE.

SIDNEY W. FARNHAM, OF CHICAGO, ILLINOIS, ASSIGNOR TO GOODMAN MANUFACTURING COMPANY, OF CHICAGO, ILLINOIS, A CORPORATION OF ILLINOIS.

ELECTRICAL SYSTEM FOR LOCOMOTIVES.

Application filed December 22, 1922. Serial No. 608,509.

*To all whom it may concern:*

Be it known that I, SIDNEY W. FARNHAM, a citizen of the United States, residing at Chicago, in the county of Cook and State of Illinois, have invented certain new and useful Improvements in Electrical Systems for Locomotives, of which the following is a specification.

This invention relates to improvements on electrical systems for gathering locomotives and has for its object to provide a new and improved device of this description, particularly adapted to be applied to gathering locomotives adapted to receive their current from a feed wire, either through a trolley or a gathering reel, and which has, as a safety feature, means whereby the electrical system is grounded through the gathering reel and a duplex conductor cable when the locomotive is operating on the reel and at a distance from the main trolley wire and in areas such as gaseous areas in a mine, in which arcs caused by improper grounding of the current through the locomotive motors might cause an explosion. As heretofore practiced, locomotives of the combination trolley and gathering reel type have been provided with duplex cable reels, but so far as I am aware, it has been standard practice to ground the electrical connections to the motor upon the locomotive frame, both while operating on the trolley and while operating on the cable reel. Therefore, when a duplex cable is utilized and the return wire in the cable is grounded on the main track adjacent the trolley wire in the usual manner, the return current may pass either through the grounded wire cable of the duplex cable or through the ground connections on the locomotive frame, the locomotive wheels and the branch track upon which the locomotive is operating. In fact, under these conditions, the return current may come back through either or both the return cable wire and the branch track, as aforesaid.

It will be understood that under the conditions aforesaid, that is to say, when the return current may pass through either the return wire of the cable or the track, arcs may be caused by this return current when it passes from the wheels to the track, or in cases of imperfect connections between track sections, such as is often the case in mines, arcs occur between the adjacent track sections. Manifestly, when these arcs occur in gaseous conditions, such as are often present in sections of a mine remote from the main haulage track, serious explosions may result.

In my present invention I provide means, preferably mounted on the reverse drum of the locomotive control and interlocked with the controlling drum thereof, whereby the current may be grounded on the locomotive frame in the usual manner when the locomotive is operating from the trolley, but when operating on the reel, a separate set of contacts are provided which cuts off the ground connections on the locomotive frame and permits the return current to pass only through the return wire on the cable. By virtue of this arrangement no current may pass through the locomotive frame and through the branch tracks in gaseous areas of a mine.

In the accompanying drawings, which illustrate one form in which my invention may be embodied, Figure 1 is a plan view of a controller with the top removed, such as may be used with my invention.

Figure 4 is a diagrammatic view, showing the various parts of a controller, together with circuits connecting the contacts of the controller with the resistance, motor, trolley, reel and feed wires.

Figure 1:
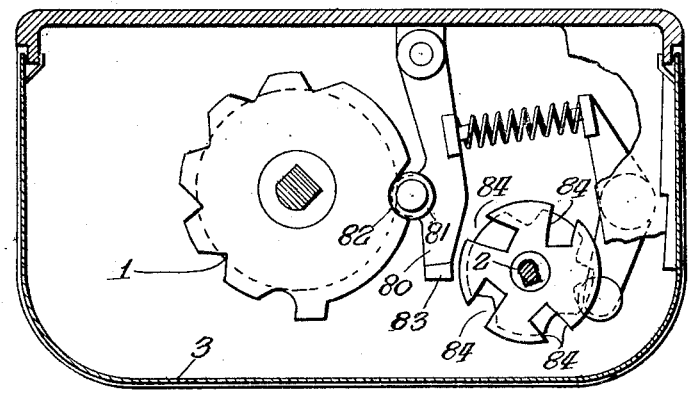

The controller consists of a rotary drum 1 containing contacts which co-operate with the stationary contacts for controlling the motor circuit, and a rotary drum 2 carrying contacts which co-operate with stationary contacts for controlling the motor. These drums are mounted in a suitable casing 3 and are arranged so that they can be independently rotated, the drum 1 being moved to control the motor circuit and the drum 2 being moved when it is desired to change the direction of rotation of the motor. As will hereinafter appear, the general type and form of control is of that shown and described in my prior Patent No. 1,425,375, issued August 8, 1922, which has as one of its main features the provision of four operating points on the reversing drum 2. These operating points are shown in the diagram in Figure 4 and comprise two operating points forwardly, one for the reel and the other for the trolley, and two other points rearwardly, or reverse, one for the trolley and the other for the reel. In Figure 4 these points are indicated at $F^r$, $F^t$, $R^t$, and $R^r$, respectively. In the present instance I have shown the motor circuit as applied to a locomotive provided with a trolley 4 adapted to make contact with a trolley wire 5 connected with a source of electric supply in the usual manner. The gathering reel 6 has a conductor cable of the duplex type comprising two conductor wires 7 and 8, insulated from each other, but bound together in a single length of cable in any approved manner. The conductor 7 of this duplex cable is provided with an end $7^a$ adapted to be hooked over the trolley wire so that the locomotive may be moved in a room or other space at a distance from the trolley wire, the cable being wound on the reel so as to keep the motor connected to the source of electrical supply in all the various positions of the locomotive. The ground wire 8 has an end $8^a$ which is adapted to be suitably connected to the track 9 running parallel with the trolley wire 5 on the main line of track. The trolley 4 is connected by conductor 10 to a stationary contact 16 associated with the reversing drum 2. Associated with this drum are a series of other stationary contacts 11, 12, 13, 17, 18, 19, 20, 21, 22. The contact 17 is connected by a conductor 23 through blow-out coil 24 with the conductor 25 connecting with the stationary contact 26 associated with the motor controlling drum 1. The contact 18 is connected by a conductor 27 with the conductor 7 on the reel 6, the connection being made in any desired manner, as by means of a contact ring 28 and a brush 29. The contact 19 is connected by a conductor 30 and fuse $30^a$ with the stationary contacts 31 associated with the drum 1. The contact 20 is connected by a conductor 32 with the armature 33 of the motor. The contact 21 is connected by a conductor 34 with the field coil 35 of the motor, said field coil being connected by conductor 36 with the field coil 37, which in turn is connected by conductor 38 to contact 12 associated with the reversing drum.

The contact 22 is connected by conductor 40 with the armature of the motor. The drum 1, in addition to the stationary contacts 26 and 31, has the stationary contacts 41, 42, 43, 44 and 45. These stationary contacts co-operate with the movable contacts on the drum 1, that is, the contacts 46, 47, 48, 49, 50, 51, 52 and 53. When these latter contacts on the drum are moved successively into contact with their opposed stationary contacts, the first movement completes the circuit through the motor and the resistance 54, and the continued movement gradually cuts out the resistance. The reversing drum 2 is provided with a series of contacts 55, 56, 57, 58, 59, 60, 61, 62, 63, 64, 65, 66, 67, 68 and 69.

Contact 11 is connected by a conductor 70 with the conductor 8 on the reel 6, the connection being made in any desired manner, as by means of a contact ring 71 and a brush 72. The contact 13 is connected through a conductor 73 to a suitable ground connection on the locomotive frame.

When the fixed contacts associated with the reverse drum 2 are engaged in the position indicated at $F^r$, the motor is adapted to be driven forwardly through the reel connections. It will then be seen that the contact 55 engages contacts 17 and 18 so as to connect them together and the current is supplied to the motor through the conductors 7 and 27. At the same time the contact 59 connects contacts 19 and 20 while contact 61 connects contacts 21 and 22 and contact 66 connects contacts 11 and 12.

The circuit is then traced as follows:— From the trolley wire 5 through the end $7^a$ and the conductor 7, thence by contact ring 28 on the reel 6 and brush 29 through conductor 27 to contact 18, thence by contact 55 to contact 17 and thence by conductor 23 to conductor 25. If now the contacts on the drum 1 are moved so that contact 53 engages contact 26, all the resistance is cut out of the motor circuit and the current then passes from conductor 25 through the contacts 26 to the contact 53, and then since all the contacts on the drum 1 are electrically connected together, the current passes successively through these contacts to the contacts 46 and 47 and then passes by contacts 31 to conductor 30 and thence to stationary contact 19 associated with the reversing drum, and thence through contact 59 to contact 20, and thence by conductor 32 to the armature 33 of the motor, thence by conductor 40 to contact 22, thence through contact 61 to contact 21, and thence by conductor 34 to the field 35, and thence through conductor 36 to field 37, and thence through conductor 38 to contact 12, thence through contact 66 to contact 11, thence through conductor 70 and brush 72 to contact ring 71 on the reel 6, thence through conductor 8 and end 8ᵃ to track 9, on the main line adjacent the trolley wire 5, whence the current returns in the usual manner to the source of current supply. With the connections as above described, the arrangement is such that the motor rotates in a forward direction.

The drum 1 is then moved to start the motor and gradually cut out the resistance in the usual manner. If it is desired to disconnect the motor from the reel the drum 1 is moved so that the contacts are in the off position, thereby disconnecting the motor from the source of current supply, and the drum 2 is moved until the contacts previously in contact are disconnected and the new contacts, indicated at Rᵗ are moved into contact position with the fixed contacts associated with drum 2.

In this position of the reversing drum the stationary contacts 11 and 18, associated with the reel conductors 7 and 8, are disconnected. At the same time trolley 4 is connected by conductor 10 and fixed contact 16 which engages contact 56. Thence the circuit is the same through the controller drum 1, the armature 33 and field coils 35 and 37, as already described for the connections through the reel until the current from the last named field coil 37 passes through conductor 38 to the fixed contact 12. From here on the circuit is changed, and instead of going through contact 66, the current goes through contact 67 to fixed contact 13 and from thence through conductor 73 to a suitable ground on the locomotive frame. In this position, as before described, the motor is arranged to move forwardly. It will be noted that the ground connections are then made through the locomotive frame and the wheels to the track in the ordinary manner. This being the arrangement when the locomotive is operating over the main haulage tracks and under conditions where proper ventilation is maintained or for other reasons, there is no danger of gas explosion caused by exposed arcs.

If it is desired to reverse the motor while connected with the trolley, the motor is cut out of the circuit by moving the drum 1 so that the contacts are in the off position and then the drum 2 is moved into position indicated at Rᵗ. The drum 1 is then moved to connect the motor into the circuit and gradually cut out the resistance in the usual manner. The circuit is then traced as follows: From the trolley 4 and conductor 10 through fixed contact 16 and contact 57 to fixed contact 17, thence through conductor 23 through various contacts on the controller drum 1 as before mentioned and thence through contacts 31 and conductor 30 to fixed contact 19 associated with the reverse drum, thence through contact 65 and conductor 65ᵃ to contact 63, thence through contact 22 and conductor 40 to the armature 33. Thence through the armature in a direction to reverse the movement thereof to conductor 32 and contact 20, thence through contact 64 and contact 21, through conductor 34, field coils 35, conductor 36 and field coil 37, thence through conductor 38 to fixed contact 12, thence through contact 68 to contact 13, thence through conductor 73 to ground on the locomotive frame. In order to move the reversing drum to the final position indicated at Rʳ it is necessary as before to move the controller 1 into position shown in Figure 1 before the drum 2 can be rotated. When the drum 2 is moved to this fourth position the circuit is then traced in a manner to reverse the current through the motor connections similar to that described in the third position, Rᵗ. The ground connections in the fourth position, however, are similar to the ground connections in the first position, that is to say, the contact 18 connected to the reel conductor 7 is connected through contact 58 to contact 17 which leads to the controller drum 1, whereas contact 12 leading from the field coils of the motor is disconnected from the fixed connection 13 which leads to the ground on the locomotive, and instead is connected through contact 69 to fixed contact 11, thence through conductor 70, brush 72 and contact ring 71 on the reel 6, to the ground conductor 8 of the duplex cable, thence through end 8ᵃ to track 9.

Figure 2:
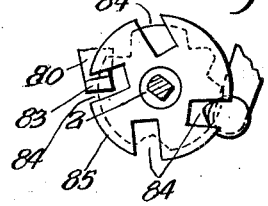
Figure 2 is a plan view of the top of the reverse drum of the control when moved to a point where the controlling drum is released.
Figure 3:
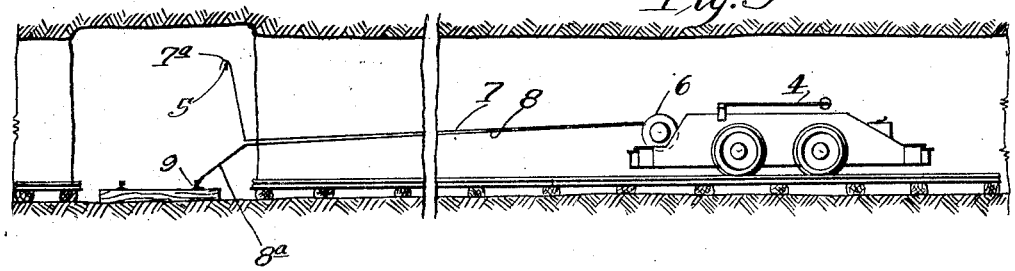
Figure 3 is a view illustrating the use of my improved electrical system as applied to a gathering locomotive of the reel type, as used in a mine.

The drums 1 and 2 are arranged so that the drum 2 cannot be turned to reverse the current through the motor while the drum 1 is in a position to connect the motor in circuit so that before the drum 2 can be turned the drum 1 must be brought back to its initial position. Any suitable means for this purpose may be used. As herein shown, a pivoted lever 80 is associated with the drum 1 and is provided with a part 81 preferably a roller, which fits into a notch 82 in the drum or a part associated therewith. The lever 80 is provided with an upstanding stop piece 83, which engages the periphery of the part 85 connected with the drum 2 when the drum is in its initial position so as to prevent the part 81 from being removed from the notch 82. The part 85 is provided with a series of notches 84. When the drum 2 is turned so that one of these notches comes opposite the upstanding stop 83, the lever 80 can be moved, the stop passing into one of these notches, as shown in Figure 2, the lever itself passing under the part 85. This locks the reversing drum 2 but releases the controlling drum 1 so that it can be turned to complete the circuit through the motor and then vary the resistance in said circuit. It will be noted that the bottom portion of the notch 82 passes beyond the plane of the periphery of the drum (see Figure 1) and the parts are so arranged that it is only when this part passes into this deep notch that the drum 2 may be released. During all the movements of the drum 1 when the part 81 is out of the notch 82, the lever 80 is held in such position that the stop 83 will never be withdrawn from the notch 84 into which it is at that time received. The part containing the notch 82 is provided with a series of other notches clearly illustrated in Figure 1 into which the part 81 passes as the drum is rotated, so as to hold the drum in any desired position, but these notches are not deep enough to permit the removal of the stop 83 from its receiving notch 84. It will thus be seen that when the drum 1 is free to turn, the drum 2 is locked against turning, and that when the drum 2 is free to turn, the drum 1 is locked against turning, thereby preventing the reversal of the current through the motor while the circuit is completed, and preventing the current from being turned on until the reversing drum is locked against movement. The reversing drum is locked during all positions of the drum 1 except its initial position, where the circuit through the motor is broken. By means of this device the motor may be connected by a plurality of connections with a source of electric supply and this connection may be made easily and quickly by manipulating the ordinary controller that controls the motor, and it will be seen that it is impossible to change from one connection to the other while the motor is in circuit, thereby eliminating danger to the operator and to the apparatus.

Certain of the contacts on drum 2, that is, contacts 11, 12, 13, 16, 17, 18, 55, 56, 57, 58, 65a, 67, 68, and 69 form what may be termed a multiple pole switch for connecting one of a plurality of sources of electric supply with the resistance of the controller, the other contacts on said drum forming the motor reversing contacts. It will be noted that I have provided a controlling device wherein there is a resistance short-circuiting drum and a motor reversing drum and a multiple pole switch for connecting one of a plurality of sources of current supply, namely, the trolley, to a ground on the locomotive frame in operating forwardly, or on reverse from the trolley, but when operating forwardly or on reverse through the gathering reel connects the motor to a ground connection only through the duplex cable of the gathering reel.

It will be understood that the controller casing 3 is preferably of a gas-tight construction, in order to prevent the exposure of arcs between the controller contacts when operating under gaseous conditions. Similarly, it is desirable to enclose the motor in a flame-proof casing, of any standard construction.

I have described in detail a particular construction embodying the invention, but it is of course evident that the parts may be varied in many particulars without departing from the spirit of my invention, and I therefore do not limit myself to the particular construction shown.

I claim as my invention:

1. In combination with an electric locomotive having a motor adapted to be connected in circuit either with a trolley or a gathering reel, a controller for said motor comprising two drums, a resistance controlled by one of said drums, the other drum being a reversing drum to reverse the motor, and switching means on the said reversing drum providing in one position a feeding connection with the trolley and a ground connection with the locomotive frame, and in another position both a feeding and a ground connection through the gathering reel, independent of said ground connection on the locomotive frame, said gathering reel having two conductors wound thereon for connection with a feed wire and a ground connection respectively.

2. In combination with an electric locomotive having a motor adapted to be connected in circuit either with a trolley or a gathering reel, a controller for said motor comprising two drums, a resistance controlled by one of said drums, the other drum being a reversing drum to reverse the motor, and switching means on the said reversing drum providing in one position a feeding connection with the trolley and a ground connection with the locomotive frame, and in another position both a feeding and a ground connection through the gathering reel, independent of said ground connection on the locomotive frame, said gathering reel having two conductors wound thereon for connection with a feed wire and a ground connection respectively, and an interlocking connection between said resistance drum and said reverse drum for preventing movement of said reversing drum while said resistance drum is in position to close the circuit.

3. In combination with an electric locomotive having a motor adapted to be connected in a circuit either with a trolley or a gathering reel, a controller for said motor comprising two drums, a resistance controlled by one of said drums, the other drum being a reversing drum to reverse the motor, said reversing drum having two sets of contacts associated therewith, one set connected with the trolley and a ground connection on the locomotive frame, and the other set connected with feed and ground connections through the gathering reel, cooperating contacts adapted when the reverse drum is moved to predetermined positions to connect the motor with either set of contacts either when the motor is running forward or backward, and means preventing the connection of the motor from being changed from the trolley to the reel or vice versa while the circuit controlled by the resistance controlling drum is completed.

Signed at Chicago, in the county of Cook and State of Illinois, this 20th day of December, 1922.

SIDNEY W. FARNHAM.